Patented Mar. 13, 1951

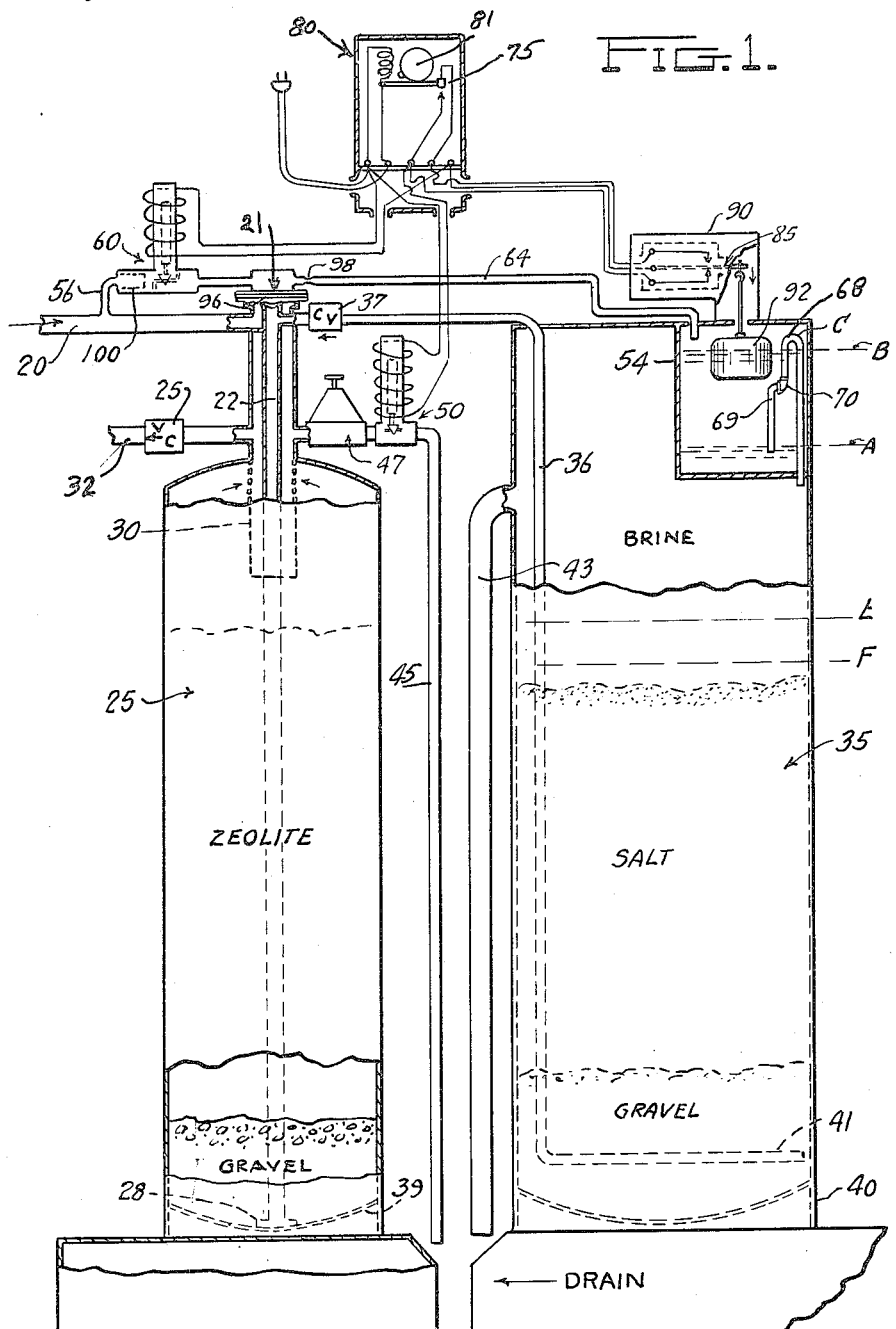

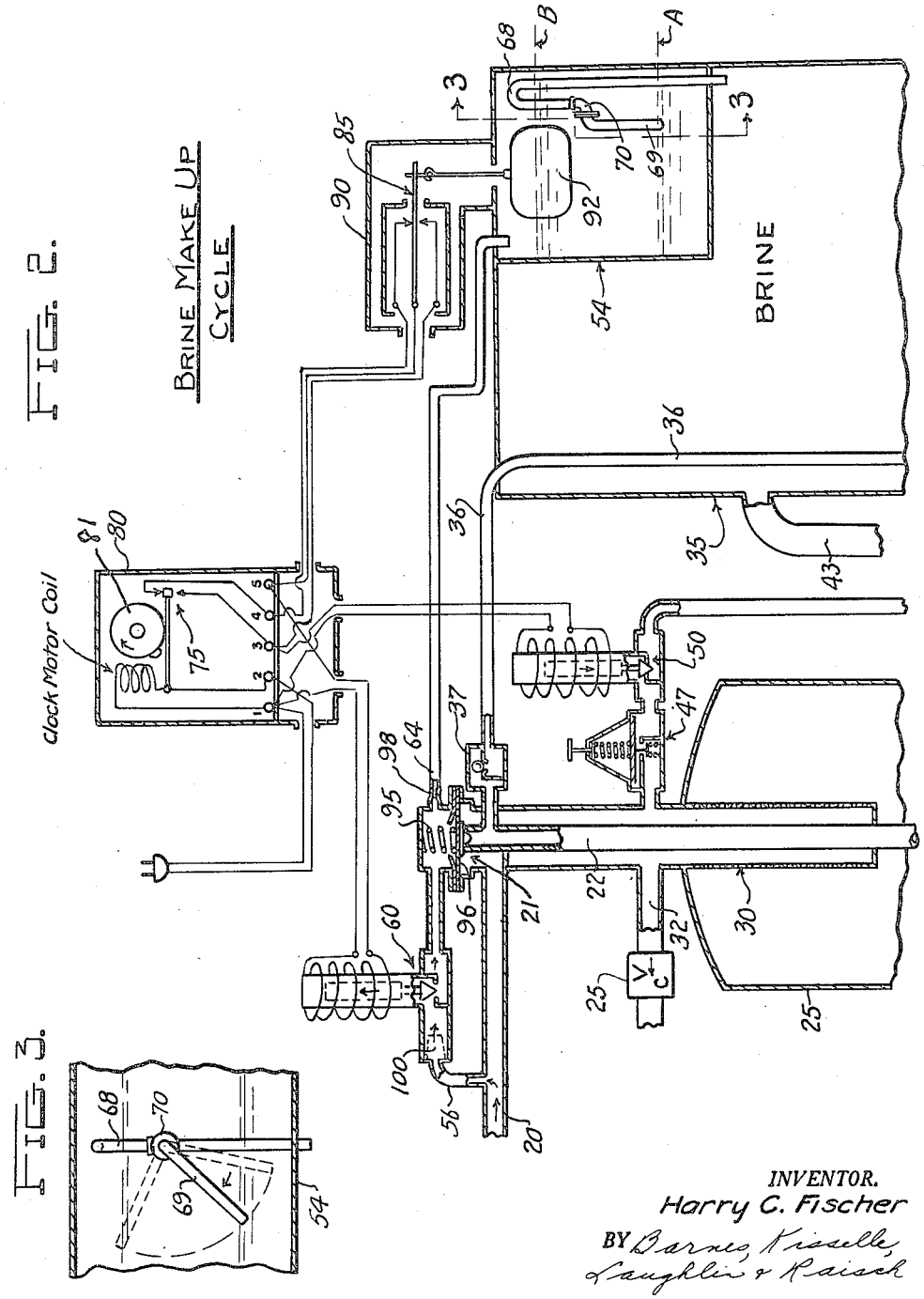

2,545,425

UNITED STATES PATENT OFFICE 2,545,425

WATER-SOFTENING APPARATUS AND SYSTEM

Harry C. Fischer, Plymouth, Mich.

Application July 31, 1947, Serial No. 765,025

9 Claims. (Cl. 210—24)

This invention relates to a water-softening apparatus and system.

The invention came about in a search for a water softener which would operate automatically over long periods of time, that is, for months, without the attention of an operator. This type of an apparatus is especially adaptable to domestic use since home owners do not wish to give attention to such apparatus any more than is necessary.

The apparatus disclosed may be characterized as the regeneration type. A chemical known to the trade as zeolite, defined as a group of hydrated aluminum and calcium or sodium silicates capable of reacting in solution, by double decomposition, with the salts of the alkali and alkali-earth metals, is used in the softening tank.

This chemical reacts with the minerals of the water to be softened but the reaction may be reversed and the chemical, zeolite, regenerated by the addition of common salt, NaCl, thereto.

The apparatus to be disclosed here is intended to be passed through the regeneration cycle at regular intervals. Novel means have been provided to control the length of such cycle and to meter the regeneration salt solution to the softening tank during a very short regeneration period which may occur at a time when the water system is least apt to be used, usually in the middle of the night.

A feature of the invention is the isolation of working parts from the brine solution and a consequent avoidance of destructive deterioration due to electrolysis and corrosion.

Another feature of the system is a separate brine tank which may be easily recharged with salt and a novel means of supplying water to the brine tank to maintain the liquid level therein.

A further feature lies in the simple regeneration circuit of valves and switches reduced to a minimum to effect four cycle operation.

Additional features of the construction and operation of the system will be evident in the following description, and in the appended claims an attempt will be made to define the features of the invention as distinctly as possible over the prior patents and publications available.

In the drawings:

Figure 1 is a vertical section and diagrammatic presentation of all of the parts of the apparatus.

Figure 2 is an enlarged view of the working parts of the apparatus.

Figure 3 is a small partial section on line 3—3 of Figure 2 illustrating one of the adjustable parts of the apparatus.

The various parts of the apparatus will now be described with reference to the drawings.

A fresh water inlet 20 supplies water through a diaphragm valve 21 to an inlet pipe 22 in a vertically disposed, standard, cylindrical softening tank 25. A distributor plate 28 at the bottom of the tank directs the incoming water from pipe 22 radially to the softening tank where it may pass upward through the zeolite charge and thence through a strainer 30 to a soft water outlet 32.

A brine tank 35 stands vertically adjacent the softening tank and a brine siphon tube 36 leads through a check valve 37 to pipe 22. Tank 25 has a bottom 39 and tank 35 has a bottom 40. Pipe 36 terminates in a leg 41 located near the bottom of the tank 35. The brine tank has an overflow tube 43 which is provided for emergency operation only. A brine drain tube 45 leads from the soft water outlet 32 through a pressure-reducing valve 47 and a solenoid valve 50.

Within the brine tank and located above the normal brine liquid level is a brine make-up tank 54. This make-up tank 54 receives fresh water from a branch line 56 leading from the fresh water inlet 20 through a solenoid actuated valve 60 to a line 64. Fresh water is dumped from the make-up tank 54 through a dumping siphon 68. A pipe 69 is pivotally jointed at 70 as shown in Figure 3 so that the lower end of the pipe 69 may be shifted upwardly to control the lower level of water to remain in tank 54 and to control thusly the amount of make-up water dumped into the brine tank.

Valves 50 and 60 are solenoid operated, controlled electrically by two switches, one switch 75 being located in a timing mechanism 80 and the other switch 85 being located in a switch box 90, the switch being controlled by a float 92 within the make-up tank 54. The timer is a 24-hour repeat cycle with a single pole, double throw action.

A timer for repeat cycles of 48, 72, or 96 hours may be used but the present disclosure will be described with relation to a 24-hour cycle. The timer is driven by a synchronous 110 volt motor. The float switch 85 is a single pole, double throw type with a minimum operating differential. Both switches have a closed-up and a closed-down position with no neutral position. The float 92 is set to reverse switch 85 when tank 54 is approximately 80% full. From the timing box 80, suitable solenoid circuits are run to valves 50 and 60. A spring 95 backs up diaphragm 96 in the diaphragm valve 21. In pipe 64 a restriction 98 is provided to meter water through to the make-up tank.

The apparatus to be described has four positions of operation which may be briefly described as follows:

1. In the service position, fresh water enters from the supply pipe and may be drawn from the softening tank after passing through the zeolite chemical which removes the hardening minerals.
2. In the brine siphoning position means is provided for siphoning brine from a brine tank to the softening tank.
3. In a washing position the brine is carried upward through the softening mineral and then into the drain.
4. In a brine make-up position, fresh water is supplied to the brine tank in a metered quantity to restore the liquid level of the brine tank.

It may be helpful to an understanding of the operation of the device to present a diagram of the relationship of the parts in the various four positions. The following table shows this relationship:

signed to pass a definite quantity of water at normal pressures.

With the operation of the timer switch 75 the solenoid valve 50 has also been energized to open position. With this valve open and since no water is entering tank 25 through the valve 21, pressure will drop in the softener tank to the point where brine will siphon up in tube 36 through the check valve 37 and down through tube 22 to the distributor 28. It will be noted that the brine level in tank 35 is always in such relation to the drain end of tube 45 that this siphoning action can take place. This will reduce the brine level in tank 35 from a point E to point F. The brine reaching the tank 25 will pass up through the gravel at the bottom of the tank and through the zeolite charge where it acts to regenerate the mineral in the usual manner. Water being displaced from tank 25 during this operation may pass through pressure-reducing valve 47 and the open valve 50 to the siphon drain leg 45 which leads to a drain opening.

*Position of part in cycle*

| Part | Service Position, Fig. 1 | Brine Siphoning | Washing | Brine Make-up, Fig. 2 |
|---|---|---|---|---|
| Timer Switch 75 | Up [1] | Down | Down [1] | Up. |
| Float Switch 85 | Down | do.[1] | Up | Up.[1] |
| Brine Make-up Valve 60 | Closed (Deenergized) | Open (Energ.) | Closed (Deenergized) | Open (Energ.). |
| Brine Wash Valve 50 | do | do | Open (Energ.) | Closed (Deenerg.). |
| Fresh Water Inlet Valve 21 | Open | Closed | Open | Closed. |

[1] Change initiates next position.

In Figure 1 the parts are shown in the position which they take in the service position which will occupy the main portion of the 24-hour day. Water enters the pipe 20 and since there is no pressure behind diaphragm 95 due to the fact that valve 60 is closed, the diaphragm valve will be opened by pressure below the diaphragm to admit water to the feed pipe 22 which directs it downwardly to the distributor plate 28. The water passes upwardly through the zeolite mineral where the objectionable minerals therein are removed in accordance with a well-known chemical reaction, and the soft water may pass out through the strainer 30 to the pipe 32 which may lead to the household or other service lines. The strainer 30 is provided to prevent suspended mineral from entering the outlet 32. The strainer preferably has outwardly projecting perforations in the walls so that mineral will not catch in and clog the openings.

It is preferred that the regeneration cycle take place during a time when the softened water is not being withdrawn. In a household unit, a time may be selected in the middle of the night, such as three a. m., when it is unlikely that there will be much use of the water system. The timer 80 may be set for operation at this time. Normally the switch blade 75 is in the up position. At the appointed time the switch blade 75 will be shifted downwardly by a cam on wheel 81 and a circuit will be completed through switch 85 in down position to the solenoid valve 60 causing it to shift upwardly, thus admitting water to pipe 64 through a strainer 100. Pressure building up behind restriction 98 will reinforce the action of the spring 95 and cause a closing of the diaphragm 96 and the diaphragm valve 21. This shuts off the city water from the softener tank 25. The water that passes through the restriction 98 goes through line 64 to the brine-make-up tank 54 to increase the level from the point A to a point B. The restriction 98 is initially de- This brine siphoning action will continue until water has passed through restriction 98 and pipe 64 to a sufficient degree to raise the level from the point A to a point B where the float 92 is lifted, and the switch 85 is moved from its down position to its up position. This shifting will close the valve 60 by reason of the breaking of the solenoid circuit and the water behind the valve 60 will be bled through the orifice 98, thus reducing the pressure behind the diaphragm valve 21 and causing the valve 21 to be opened by the line pressure below the diaphragm 96.

This opening of the line pressure to pipe 22 causes a setting of the check valve 37 and thus prevents further siphoning of brine to tank 25. Since valve 50 is still open, water from line 20 passes from the distributor 28 up through the softening tank and the zeolite charge to wash the brine up through the zeolite and down drainpipe 45 to the drain. The pressure-reducing valve 47 is provided between the tank and the valve 50 to regulate the flow through pipe 45 independently of line pressure at 20; thus variations in line pressure will not affect the time of the washing and the quantity of water being passed through the softening tank during the washing period. For a given pressure and orifice size, the flow can be timed to wash the brine completely from the mineral in 25 minutes. This period of washing and the other period of brine siphoning may be adjusted, of course, to the various installation requirements.

The brine siphoning cycle is initiated by the timer and the timer is set to return to its original position within a definite period such as 30 minutes or 45 minutes so that switch 75 is in closed-up position. At this time the float switch 85 is in closed-up position by reason of the water level in tank 54. The shifting of these switches has caused valve 60 to open and valve 50 to close. With valve 60 open, diaphragm 21 will again close and water will again flow into tank 54 through restriction 98. When water reaches the level C in tank 54, the siphon 68 will be complete and will start to drop water from tank 54 at a much faster rate than it may enter through restriction 98. The water level in tank 54 will continue to drop until it reaches the point A when the siphon is broken. Meanwhile the float switch has returned to its closed-down position. This operation of switch 85 de-energizes valve 60 and it returns to its closed position, at which time all of the parts are in the service position once again. The water from tank 54 which is dropped from siphon 68 has replaced the water level in the brine tank from F to E again. The apparatus is thus ready for softening service for the remainder of a 24-hour period after which it may be again regenerated as above described. The operation will repeat itself daily and the only attention that is needed is a recharging of the brine tank with salt about every 6 months. A suitable opening may be provided in the top of the brine tank 35 for this purpose.

It will be understood that the system may be set to regenerate every 48 or every 96 hours rather than every 24 hours. This will depend on tank capacity and on the hardness of the water in any particular location as well as on other variable factors.

The amount of water transferred from make-up tank 54 to brine tank 35 is regulated first by the amount passed by restriction 98 and secondly by the position of the lower end of pipe 69. As shown in Figure 3 this position may be varied.

I claim:

1. In a water-softening apparatus of the type having a softening tank and a brine tank, and a supply pipe to the softening tank for raw water and a withdrawal pipe for softened water from the softening tank, an auxiliary tank positioned above the normal liquid level of the brine tank, means for passing brine to the softening tank in response to reduction in pressure in the softening tank, valve means operating simultaneously to reduce pressure in the softening tank and to meter fresh water to the auxiliary tank, means responsive to the liquid level in the auxiliary tank to interrupt the last means, and means to effect dumping of metered water from the auxiliary tank to the brine tank to replenish liquid therein.

2. In a water-softening apparatus of the type having a softening tank with a raw water inlet and service and waste outlets, and a brine tank, an auxiliary tank positioned adjacent the top of the brine tank, means for passing brine to the softening tank in response to reduction in pressure in the softening tank, time controlled valve means to close the inlet to the softening tank and open the waste outlet thereto to effect reduction in pressure within the softening tank, time-controlled valve means to meter fresh water to the auxiliary tank, the two valve means being inter-connected whereby fresh water metering occurs only while the softening tank inlet is closed, and means responsive to liquid level in the auxiliary tank to interrupt said fresh-water metering and to dump water from the auxiliary tank to the brine tank.

3. In a water-softening apparatus wherein softening and regenerating solution tanks are operatively connected by a flow system, an inlet pipe and an outlet pipe provided for the softening tank, and electrically-operated valves for control of a regeneration cycle, a fresh-water control tank located at the top of the brine tank, means operable during a regeneration cycle to meter fresh water to said control tank, a siphon loop with entrance in said control tank and outlet leading to the brine tank, a liquid level responsive means in the control tank operatively connected to the electrically-operated valves, the siphon loop being located relative to the liquid level responsive means whereby when the liquid level is high enough to actuate said means it is yet not high enough to fill the siphon loop, the entrance to the siphon loop within the control tank being materially below the liquid level at which the responsive means is actuated.

4. In a water-softening apparatus of the type having a softening tank and a brine tank, an auxiliary tank positioned in the brine tank, a supply pipe to the softening tank, a brine pipe connected to the brine tank a pipe to the auxiliary tank restricted to meter water thereto, a drain pipe connected to the softening tank at the top thereof and leading to a drain point below the point of connection of the brine pipe to the brine tank, a control valve in the restricted pipe and a control valve in the drain pipe each movable independently to open or closed positions, whereby opening of the control valves causes bleeding of line pressure from the softening tank to effect siphoning of brine to the softening tank, means for imparting control movement to said control valves in response to electrical impulse, and an electrical system associated with said means including only two single-pole, double-throw switches, one to initiate a brine siphoning cycle by opening both of said control valves, and one to initiate a service cycle by closing both control valves, the two switches co-operating in the second and third stages of a four-stage cycle to initiate a washing stage and a brine make-up stage by respective close-open and open-close positions of said control valves.

5. In a water-softening apparatus of the type having a softening tank and a brine tank, an auxiliary tank positioned in the brine tank, a supply pipe to the softening tank, a brine pipe from the brine tank a pipe to the auxiliary tank restricted to meter water thereto, a drain pipe connected to the softening tank at the top thereof and leading to a drain point below the entrance of the brine pipe to the brine tank, a control valve in the restricted pipe and a control valve in the drain pipe each movable independently to open or closed positions, whereby opening of the control valves causes bleeding of line pressure from the softening tank to effect siphoning of brine to the softening tank, and a four-stage electrical cycle for operating a regeneration cycle in said system comprising two electrical actuating means for operating said control valves to open position each connected to one side of a source of electrical power, the pole of the second being connected to one side of one of the actuating means, one throw-side of each switch being connected together, the other throw-side of each switch being connected together and to one side of the other actuating means whereby manipulation of said switches may effect one of four conditions in said control valves: both open, both closed, one open, one closed and vice versa.

6. In a water-softening apparatus of the type having a softening tank with a raw water inlet at one end, a soft water outlet at the other end, and a waste outlet, and a brine tank, an auxiliary tank positioned adjacent the top of the brine tank, a supply pipe to the softening tank, an outlet to the brine tank and a brine pipe from the brine tank outlet to the softening tank, means forming a restricted passage from the supply pipe to the auxiliary tank to meter water thereto, a drain passage connected to the waste outlet of the softening tank at the top thereof and leading to a drain point below the outlet of the brine tank, a control valve in the restricted passage and a control valve in the drain passage each movable to open or closed positions, a normally open valve in the supply pipe movable to close the supply pipe when the control valve in the restricted passage is open, whereby opening of the control valves causes simultaneous metering of water to the auxiliary tank and bleeding of line pressure from the softening tank to effect siphoning of brine to the softening tank, means responsive to liquid level in the auxiliary tank to cause the control valve in the restricted passage to close after a predetermined period of filling, thus opening the valve in the supply pipe and effecting washing of the chemical in the softening tank to the drain through the drain passage, and means to dump the water from the auxiliary tank to the brine tank to replenish the level therein.

7. An apparatus as described in claim 6 in which the dumping means in the auxiliary tank comprises a siphon with its neck located at dump level in the tank and having one leg in the tank and the other leg leading to the brine tank.

8. An apparatus as described in claim 6 in which the dumping means in the auxiliary tank comprises a siphon with its neck located at dump level in the tank and having one leg in the tank adjustable to varying levels therein and the other leg leading to the brine tank.

9. The combination in an automatic water treating apparatus having a water treating tank, piping connected to both ends of said treating tank to provide a water supply pipe, a service pipe, and a waste pipe, and brine tank, of a valve controlled restricted passage leading from the supply pipe to the brine tank to furnish replenishment liquid, a pressure responsive valve to open and close said supply pipe to the treating tank, means connecting said valve to said passage whereby, when said passage is open to the supply pipe, the pressure responsive valve will close to cut off pressure within the treating tank, a first passage connecting the brine tank with the bottom of the treating tank, a second passage connecting the top of the treating tank with a drain leg extending to a point below the brine tank end of the first passage, a control valve in said second passage whereby when said pressure responsive valve is closed and said control valve is open brine will siphon from the brine tank to the treating tank.

HARRY C. FISCHER.

REFERENCES CITED

The following references are of record in the file of this patent:

UNITED STATES PATENTS

| Number | Name | Date |
|---|---|---|
| 1,611,422 | Duden | Dec. 21, 1926 |
| 1,674,717 | Eisenhauer | June 26, 1928 |
| 1,691,862 | Thomson et al. | Nov. 13, 1928 |
| 1,913,238 | Johnson | June 6, 1933 |
| 2,003,739 | Clark | June 4, 1935 |
| 2,050,614 | Kerr | Aug. 11, 1936 |
| 2,061,797 | Eisenhauer | Nov. 24, 1936 |
| 2,132,312 | Moore | Oct. 4, 1938 |
| 2,329,052 | Irwin | Sept. 7, 1943 |
| 2,407,539 | Daniels | Sept. 10, 1946 |